United States Patent [19]
Nakamura et al.

[11] Patent Number: 5,652,619
[45] Date of Patent: Jul. 29, 1997

[54] IMAGE SYSTEM FOR VIDEO CONFERENCE

[75] Inventors: Hiroshi Nakamura, Kasuga; Yasuaki Muranaka, Fukuoka-ken, both of Japan

[73] Assignee: Matsushita Electric Industrial Co., Ltd., Osaka, Japan

[21] Appl. No.: 501,161

[22] Filed: Jul. 11, 1995

Related U.S. Application Data

[63] Continuation of Ser. No. 253,046, Jun. 2, 1994, abandoned.

[30] Foreign Application Priority Data

Jun. 11, 1993 [JP] Japan .................... 5-140499

[51] Int. Cl.$^6$ .................................... H04N 5/225
[52] U.S. Cl. ............................... 348/211; 348/15
[58] Field of Search .......................... 348/15, 211, 212, 348/213; H04N 5/225, 7/14, 7/15

[56] References Cited

U.S. PATENT DOCUMENTS

| | | | |
|---|---|---|---|
| 4,450,487 | 5/1984 | Koide | 348/211 |
| 4,516,156 | 5/1985 | Fabris et al. | 340/709 |
| 4,716,465 | 12/1987 | Meyer | 348/211 |
| 4,974,088 | 11/1990 | Sasaki | 348/213 |
| 5,079,634 | 1/1992 | Hosono | 348/212 |
| 5,128,770 | 7/1992 | Inana et al. | 348/211 |
| 5,206,732 | 4/1993 | Hudson | 348/211 X |
| 5,218,627 | 6/1993 | Corey et al. | 379/53 |
| 5,305,100 | 4/1994 | Choi | 348/211 X |

FOREIGN PATENT DOCUMENTS

| | | |
|---|---|---|
| 0356105 | 2/1990 | European Pat. Off. . |
| 0523617 | 1/1993 | European Pat. Off. . |
| 0578183 | 1/1994 | European Pat. Off. . |
| 2243066 | 9/1990 | Japan . |
| 5075995 | 3/1993 | Japan . |
| 5130600 | 5/1993 | Japan . |

*Primary Examiner*—Wendy Garber
*Attorney, Agent, or Firm*—Lowe, Price, LeBlanc & Becker

[57] ABSTRACT

An image taking apparatus includes a wireless operation unit. The wireless operation unit includes a key input section, and a section for transmitting a wireless signal carrying operation information in response to operation of the key input section. A camera portion includes a camera body, a section for receiving the wireless signal from the wireless operation unit, a section for extracting the operation information from the wireless signal received by the receiving section, and a section for controlling the camera body. A main control unit includes a section connected to the extracting section in the camera portion for generating a camera control instruction in response to the operation information extracted by the extracting section, and a section connected to the controlling section in the camera portion for outputting the camera control instruction to the controlling section. The controlling section in the camera portion includes a device for controlling the camera body in response to the camera control instruction outputted from the main control unit.

2 Claims, 9 Drawing Sheets

FIG. 5

| INPUT KEY | CONTROL TYPE | 8-BIT OPERATION INFORMATION |
|---|---|---|
| B1 | RIGHT-HANDED TURN OF LENS UNIT | 00000000 |
| B2 | LEFT-HANDED TURN OF LENS UNIT | 00000001 |
| B3 | VIDEO FADE-IN | 00000010 |
| B4 | VIDEO FADE-OUT | 00000011 |
| B5 | INPUT VIDEO SIGNAL FROM CAMERA | 00000100 |
| B6 | INPUT VIDEO SIGNAL FROM RECORDING AND REPRODUCING DEVICE | 00000101 |
| B7 | RESERVED | 00000110 |
| B8 | RESERVED | 00000111 |

IMAGE SYSTEM FOR VIDEO CONFERENCE

This application is a continuation of application Ser. No. 08/253,046 filed Jun. 2, 1994 now abandoned.

BACKGROUND OF THE INVENTION

1. Field of the Invention

This invention relates to an image taking apparatus including a camera and an electrically-powered actuator for moving the camera.

2. Description of the Prior Art

Japanese published unexamined patent application 2-243066 discloses a remote control apparatus for a television camera. In Japanese application 2-243066, the television camera is provided with various electrically-powered actuators such as motors for panning and tilting a camera body and motors for executing a focusing process and a zooming process. The actuators are operated by remote control to execute a required process (for example, a tilting process) as the user operates a control box. The cable connecting the control box to the actuators tends to be obstructive to persons walking therearound.

In typical television conference systems or television meeting systems, a main controller is electrically connected between a key input unit and a television camera. The electrical connection between the main controller and the key input unit uses a cable. The television camera includes electrically-powered actuators for various processes such as a panning process, a tilting process, a focusing process, and a zooming process. The actuators are operated by remote control to execute a required process (for example, a tilting process) as the user operates the key input unit. The cable connecting the key input unit and the main controller tends to be obstructive to persons walking therearound.

SUMMARY OF THE INVENTION

It is a main object of this invention to provide an improved image taking apparatus.

A first aspect of this invention provides an image taking apparatus comprising a wireless operation unit including a key input section, and means for transmitting a wireless signal carrying operation information in response to operation of the key input section; a camera portion including a camera body, means for receiving the wireless signal from the wireless operation unit, means for extracting the operation information from the wireless signal received by the receiving means, and means for controlling the camera body; and a main control unit including means connected to the extracting means in the camera portion for generating a camera control instruction in response to the operation information extracted by the extracting means, and means connected to the controlling means in the camera portion for outputting the camera control instruction to the controlling means; wherein the controlling means in the camera portion includes means for controlling the camera body in response to the camera control instruction outputted from the main control unit.

A second aspect of this invention provides an image taking apparatus comprising a wireless operation unit including a key input section, and means for transmitting a wireless signal carrying operation information in response to operation of the key input section; a camera portion including a camera body, means for receiving the wireless signal from the wireless operation unit, and means for controlling the camera body; and a main control unit including means connected to the receiving means in the camera portion for extracting the operation information from the wireless signal received by the receiving means, means connected to the extracting means in the camera portion for generating a camera control instruction in response to the operation information extracted by the extracting means, and means connected to the controlling means in the camera portion for outputting the camera control instruction to the controlling means; wherein the controlling means in the camera portion includes means for controlling the camera body in response to the camera control instruction outputted from the main control unit.

A third aspect of this invention provides a camera arrangement comprising a camera lens; means for moving the lens; means for receiving a wireless signal carrying operation information; means for extracting the operation information from the wireless signal received by the receiving means; and means for controlling the moving means in response to the operation instruction extracted by the extracting means or an externally-applied operation instruction.

A fourth aspect of this invention provides a camera arrangement comprising a fixed portion; a movable portion movably connected to the fixed portion; a camera lens supported in the movable portion; means for moving the movable portion relative to the fixed portion; means provided in the fixed portion for receiving a wireless signal carrying operation information; means for extracting the operation information from the wireless signal received by the receiving means; and means for controlling the moving means in response to the operation instruction extracted by the extracting means or an externally-applied operation instruction.

A fifth aspect of this invention provides a main control unit for a television conference system including a camera portion, a display, and a communication line, the main control unit comprising means for outputting a camera control instruction to the camera portion; means for encoding first image information generated by the camera body into a first image signal of a given code, and outputting the first image signal to the communication line; means for decoding a second image signal of a given code which is transmitted via the communication line into second image information; and means for outputting the second image information to the display.

A sixth aspect of this invention provides an apparatus comprising a wireless operation unit including a manually-operated section and means for generating and transmitting a wireless signal containing a camera control instruction in response to operation of the manually-operated section; means spatially separated from the wireless operation unit for receiving the wireless signal from the wireless operation unit; means for extracting the camera control instruction from the wireless signal received by the receiving means; a camera; and means for controlling the camera in response to the camera control instruction extracted by the extracting means.

BRIEF DESCRIPTION OF THE DRAWINGS

FIG. 5 is a diagram of the relation among keys, control types, and the contents of 8-bit information in connection with a wireless operation unit in the system of FIG. 1.

DESCRIPTION OF THE FIRST PREFERRED EMBODIMENT

Figure 1:
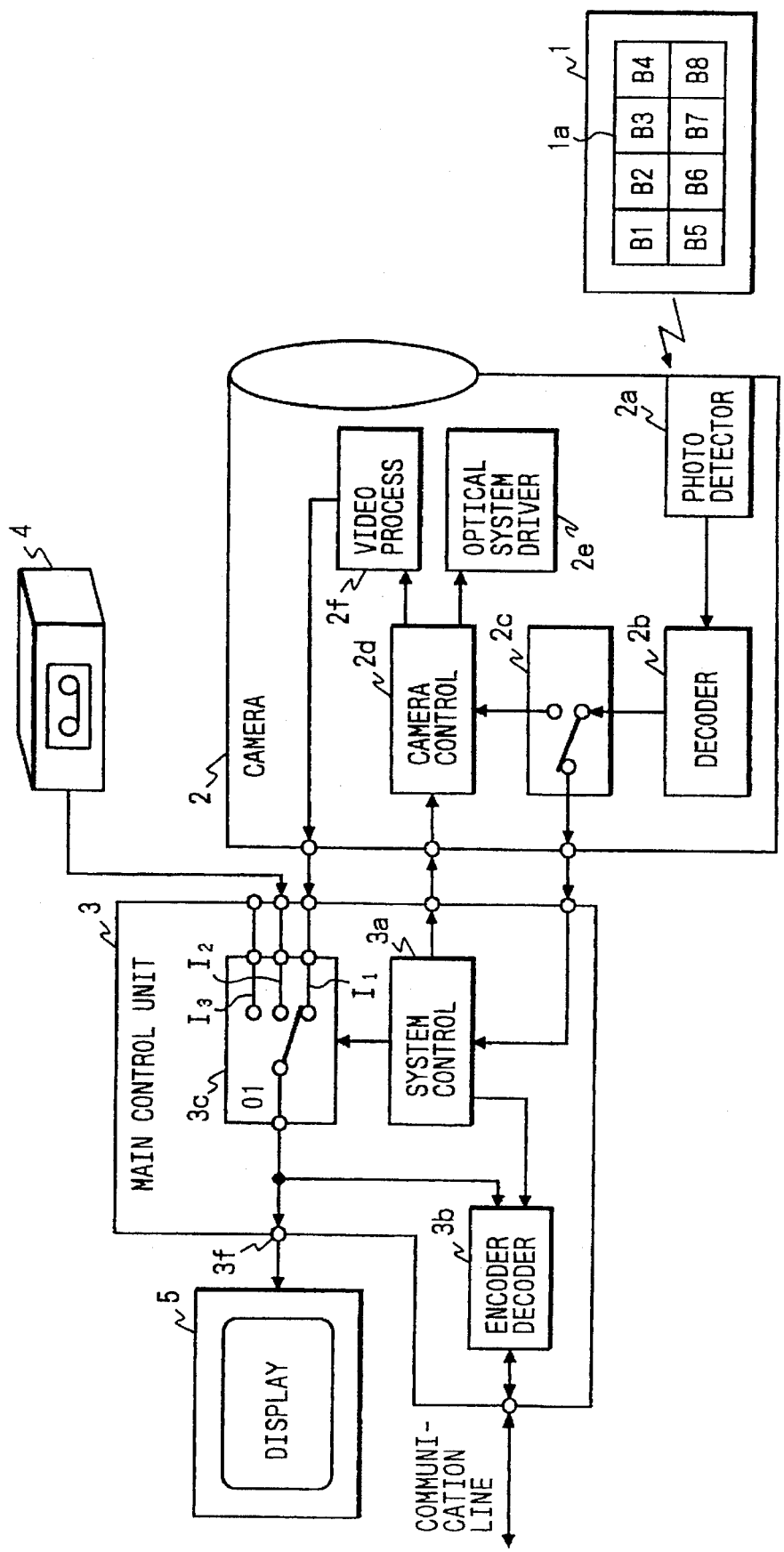
FIG. 1 is a block diagram of a television conference system according to a first embodiment of this invention.

With reference to FIG. 1, a television conference system includes a wireless operation unit 1, a television camera 2, and a main control unit 3. The wireless operation unit 1 transmits an infrared-ray signal when being actuated by the user. The television camera 2 takes an image of a conference. The television camera 2 has a window for receiving the infrared-ray signal from the wireless operation unit 1. The main control unit 3 is electrically connected to the television camera 2. The main control unit 3 is designed to control the operation of the television conference system. The main control unit 3 includes an encoder and a decoder operating on a television signal including video information and audio information.

A recording and reproducing device 4 is electrically connected to the main control unit 3. The recording and reproducing device 4 functions to record and reproduce a video signal and an audio signal into and from a recording medium such as a magnetic tape. A display 5 is electrically connected to the main control unit 3. The display 5 serves to indicate an image to the user.

A microphone (not shown) is successively followed by an audio processor (not shown) and a multiplexer (not shown). Audio information generated by the microphone is fed to the multiplexer via the audio processor. Video information generated by the television camera 2 is also fed to the multiplexer. The multiplexer combines the audio information and the video information into a television signal of a given format.

The display 5 indicates an image represented by a television signal. The display 5 is provided with an audio circuit and a loudspeaker for reproducing audio information from the television signal.

The wireless operation unit I has a key input section 1a including an array of keys B1, B2, B3, B4, B5, B6, B7, and B8. The wireless operation unit 1 also has a section for generating an electric signal in response to actuation of the keys B1–B8, a section for generating and emitting an infrared-ray signal, and a section for modulating the infrared-ray signal in response to the electric signal.

The television camera 2 contains a photodetector 2a and a decoder 2b. The photodetector 2a functions to receive an infrared-ray signal, and to convert the received infrared-ray signal into a corresponding electric signal. The decoder 2b is electrically connected to the photodetector 2a. The decoder 2b includes a microcomputer having a combination of an I/O port, a CPU, a ROM, and a RAM. The decoder 2b operates in accordance with a program stored in the ROM.

The television camera 2 also has a switch 2c, a camera controller 2d, an optical system driver 2e, and a video processor 2f. The switch 2c is electrically connected to the decoder 2b, the camera controller 2d, and the main control unit 3. The switch 2c receives an output signal from the decoder 2b. The switch 2c selectively transmits the output signal from the decoder 2b to the camera controller 2d or the main control unit 3. The switch 2c includes, for example, a manual switch. The camera controller 2d is electrically connected to the optical system driver 2e, the video processor 2f, and the main control unit 3. The camera controller 2d includes, for example, a microcomputer or a similar device having a combination of an I/O port, a CPU, a ROM, and a RAM. The camera controller 2d can operate in accordance with a program stored in the ROM. The optical system driver 2e is mechanically connected to a camera optical system. The optical system driver 2e includes electrically-powered actuators such as motors for moving a camera body and a camera lens. The video processor 2f converts an image, received via the optical system, into a corresponding video signal. The video processor 2f is electrically connected to the main control unit 3. The video signal outputted from the video processor 2f is fed to the main control unit 3.

Figure 2:
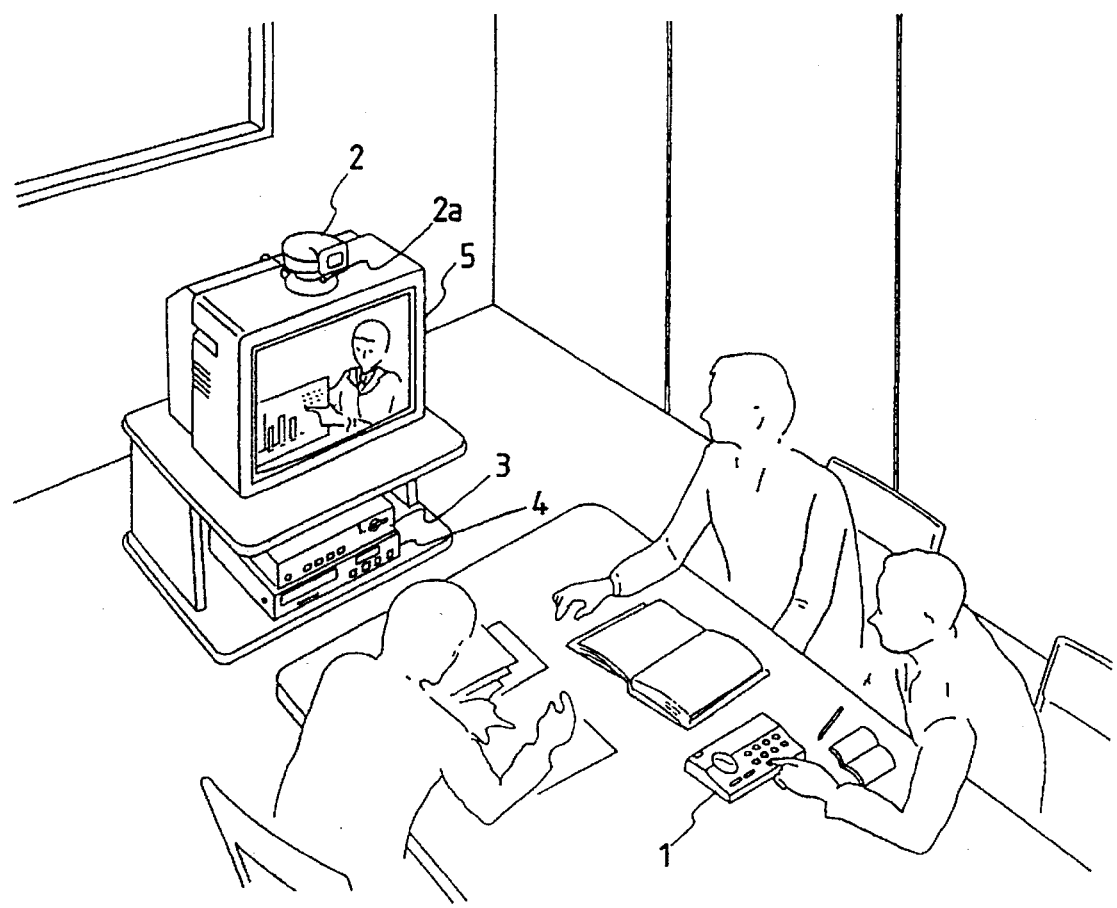
FIG. 2 is a perspective view of the television conference system of FIG. 1.

As shown in FIG. 2, the television camera 2 can be placed on the display 5. The display 5 is carried on a rack in which the main control unit 3 and the recording and reproducing device 4 are located in a stacked manner.

Figure 3:
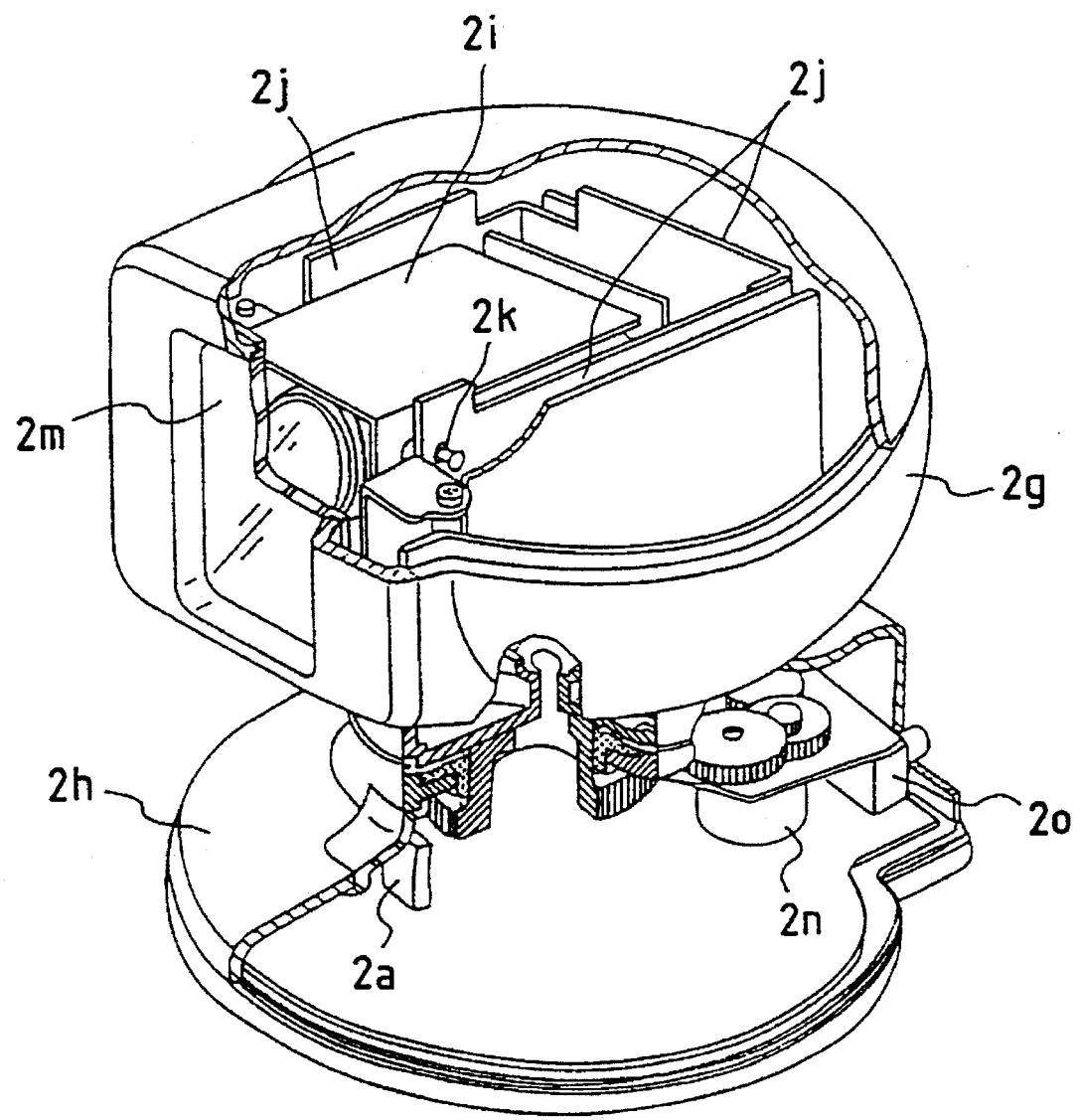
FIG. 3 is a partially-cutaway view in perspective of a television camera in the system of FIG. 1.

As shown in FIG. 3, the television camera 2 has a movable casing 2g and a fixed casing 2h. The movable casing 2g is rotatably connected to and supported on the fixed casing 2h. As will be made clear later, the movable casing 2g contains a driver for tilting a lens unit and a video circuit including an image-taking device such as a photo-to-electrical conversion device. The fixed casing 2h contains a panning driver and a control circuit.

A lens unit 2i and a main frame 2j are located in the movable casing 2g. The main frame 2j is secured to the walls of the movable casing 2g. The lens unit 2i is supported on the main frame 2j via a tilting shaft 2k. The lens unit 2i can tilt relative to the main frame 2j about the tilting shaft 2k. A tilting motor supported by the main frame 2j serves to rotate the tilting shaft 2k. As the tilting shaft 2k is rotated, the lens unit 2i is tilted. The tilting motor is a member of the optical system driver 2e (see FIG. 1). A transparent plate 2m secured to the walls of the movable casing 2g extends in front of the lens unit 2i. The transparent plate 2m protects the lens unit 2i.

A panning motor 2n and a gear arrangement are located in the fixed casing 2h. The output shaft of the panning motor 2n is coupled with the gear arrangement. The gear arrangement is connected to the movable casing 2g. Thus, a rotational force can travel from the output shaft of the panning motor 2n to the movable casing 2g. As the panning motor 2n is activated, the movable casing 2g is turned and hence the lens unit 2i is panned. The panning motor 2n is a member of the optical system driver 2e (see FIG. 1). A power supply and signal input/output section 20 is located at a back portion of the fixed casing 2h. The photodetector 2a for receiving an infrared-ray signal is located at a front portion of the fixed casing 2h. The front face of the fixed casing 2h has a window for conducting an infrared-ray signal to the photodetector 2a.

As shown in FIG. 1, the main control unit 3 includes a system controller 3a and an encoder/decoder 3b. The system controller 3a is electrically connected to the switch 2c and the camera controller 2d in the television camera 2. The system controller 3a serves to output instructions for controlling the television conference system. The system controller 3a includes, for example, a microcomputer or a similar device having a combination of an I/0 port, a CPU, a ROM, and a RAM. The system controller 3a can operate in accordance with a program stored in the ROM. The encoder/decoder 3b is electrically connected to the system controller 3a and a communication line. Image information and audio information can be transmitted to and received from a communication opposite party of a television conference via the encoder/decoder 3b and the communication line. The encoder/decoder 3b has a section for encoding an analog television signal into a corresponding digital television signal of a given code, and a section for decoding a digital television signal of a given code into a corresponding analog television signal.

The decoder/encoder 3b is electrically connected to the display 5 via an output port 3f of the main control unit 3. The analog television signal generated by the decoder/encoder 3b travels to the display 5 so that video information and audio information in the analog television signal can be reproduced by the display 5.

The main control unit 3 also includes a switch 3c having one output terminal O1, three input terminals I1, I2, and I3, and a control terminal. The switch 3c selects one of the input terminals I1, I2, and I3, and connects the selected input terminal to the output terminal O1 in response to a control signal fed to the control terminal thereof. The input terminal I1 of the switch 3c is electrically connected to the video processor 2f in the television camera 2. The input terminal I2 of the switch 3c is electrically connected to the recording and reproducing device 4. The input terminal I3 of the switch 3c is reserved. The output terminal O1 of the switch 3c is electrically connected to the encoder/decoder 3b. The output terminal O1 of the switch 3c is electrically connected to the display 5 via the output port 3f of the main control unit 3. The control terminal of the switch 3c is electrically connected to the system controller 3a. Accordingly, the switch 3c is controlled by the system controller 3a.

Different types of control of the television conference system are assigned to the keys B1, B2, ..., B7, and B8 of the key input section 1a of the wireless operation unit 1 respectively. The key input section 1a outputs an 8-bit digital signal (8-bit information or 8-bit data) representative of a desired control type in response to actuation of the keys B1, B2, ..., B7, and B8.

As shown in FIG. 5, actuation of the key B1 generates an 8-bit signal of "00000000" which represents that a desired control type is a right-handed rotation of the lens unit 2i (see FIG. 3). Actuation of the key B2 generates an 8-bit signal of "00000001" which represents that a desired control type is a left-handed rotation of the lens unit 2i (see FIG. 3). Actuation of the key B3 generates an 8-bit signal of "00000010" which represents that a desired control type is a video fade-in process. Actuation of the key B4 generates an 8-bit signal of "00000011" which represents that a desired control type is a video fade-out process. Actuation of the key B5 generates an 8-bit signal of "00000100" which represents that a desired control type is a process of inputting a television signal into the main control unit 3 from the television camera 2. Actuation of the key B6 generates an 8-bit signal of "00000101" which represents that a desired control type is a process of inputting a television signal into the main control unit 3 from the recording and reproducing device 4. Actuation of the key B7 generates an 8-bit signal of "00000110" which is reserved. Actuation of the key B8 generates an 8-bit signal of "00000111" which is reserved.

When a left-handed rotation of the movable casing 2g including the lens unit 2i in the television camera 2 is desired, the user actuates the key B8 so that the key input section 1a outputs an electric 8-bit signal of "00000001". When one of the other control types is desired, the user actuates the corresponding key so that the key input section 1a outputs a corresponding electric 8-bit signal. The wireless operation unit 1 includes a section for generating an electric basic pulse signal in response to the electric 8-bit signal outputted from the key input section 1a. The wireless operation unit 1 also includes a section for generating an infrared-ray signal, and a section for modulating the infrared-ray signal in response to the electric basic pulse signal. Thus, the infrared-ray signal represents the desired control type. The infrared-ray signal is transmitted from the wireless operation unit 1.

Figures 6, 7:
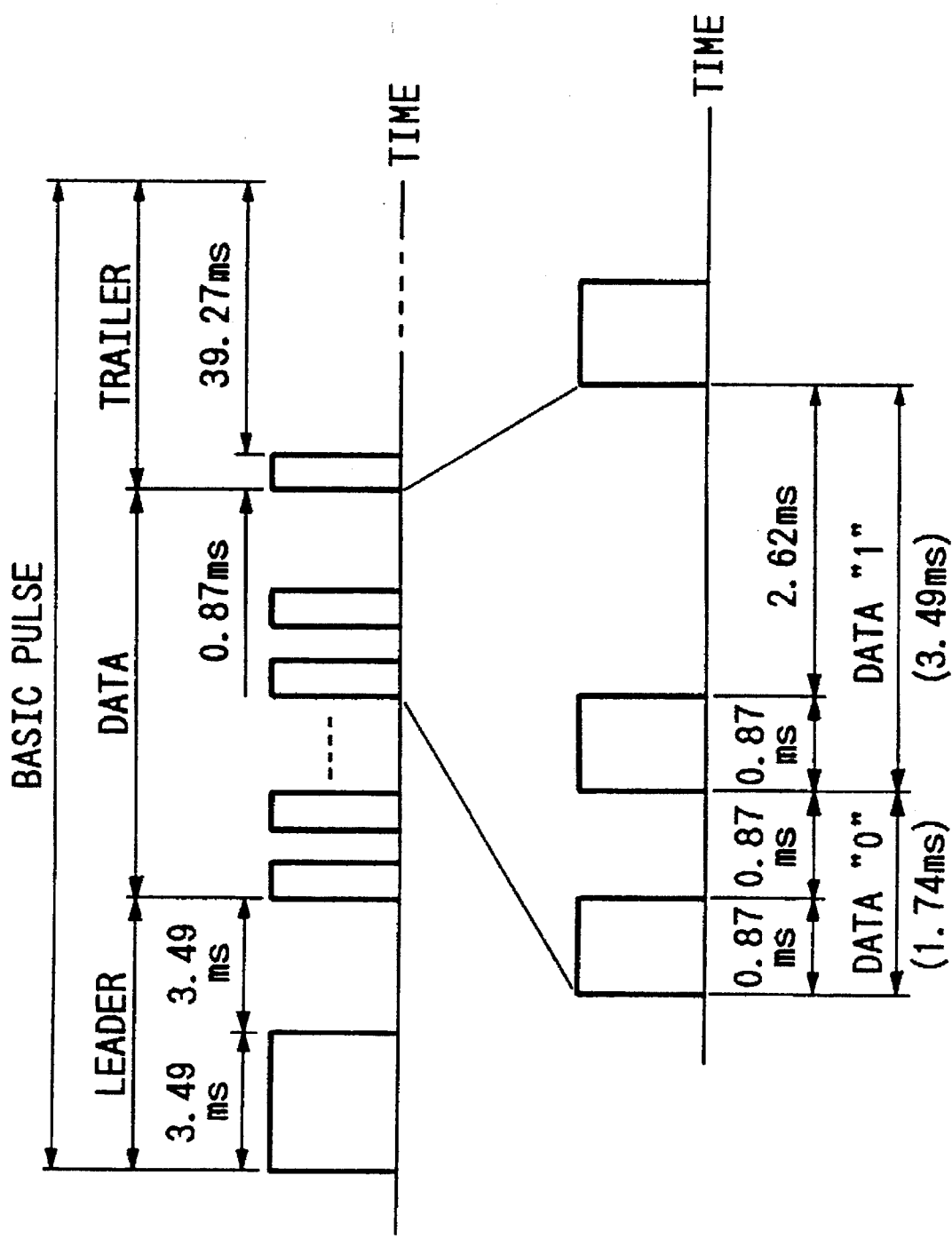
FIG. 6 is a time-domain diagram of the waveform of an example of a basic pulse signal generated in the wireless operation unit in the system of FIG. 1.
FIG. 7 is a time-domain diagram of the waveform of a data portion in the basic pulse signal of FIG. 6.

As shown in FIG. 6, an electric basic pulse signal generated in the wireless operation unit 1 has a sequence of a leader portion, a data portion, and a trailer portion. Information of a desired control type is represented by the data portion of the electric basic pulse signal. The data portion of the electric basic pulse signal results from pulse-position modulation responsive to the electric 8-bit signal outputted from the key input section 1a. In the data portion of the electric basic pulse signal, H-level periods alternate with L-level periods. H-level periods agree with a fixed time of 0.87 ms while L-level periods have variable lengths. A set of an H-level period and a following L-level period corresponds to one bit. As shown in FIG. 7, a logic state ("0" or "1") of each bit depends on the total length of an H-level period and a following L-level period. Under typical conditions, a logic state of "0" corresponds to a total period length of 1.74 ms, and a logic state of "1" corresponds to a total period length of 3.49 ms. The LSB of the electric 8-bit signal outputted from the key input section 1a is represented by a head of the data portion of the electric basic pulse signal.

The photodetector 2a in the television camera 2 receives the infrared-ray signal from the wireless operation unit 1, and converts the infrared-ray signal into a corresponding electric basic pulse signal (FIG. 6). The photodetector 2a outputs the electric basic pulse signal to the decoder 2b. The decoder 2b extracts 8-bit information (8-bit data) of a desired control type from the electric basic pulse signal. The decoder 2b outputs the 8-bit data.

Figure 8:
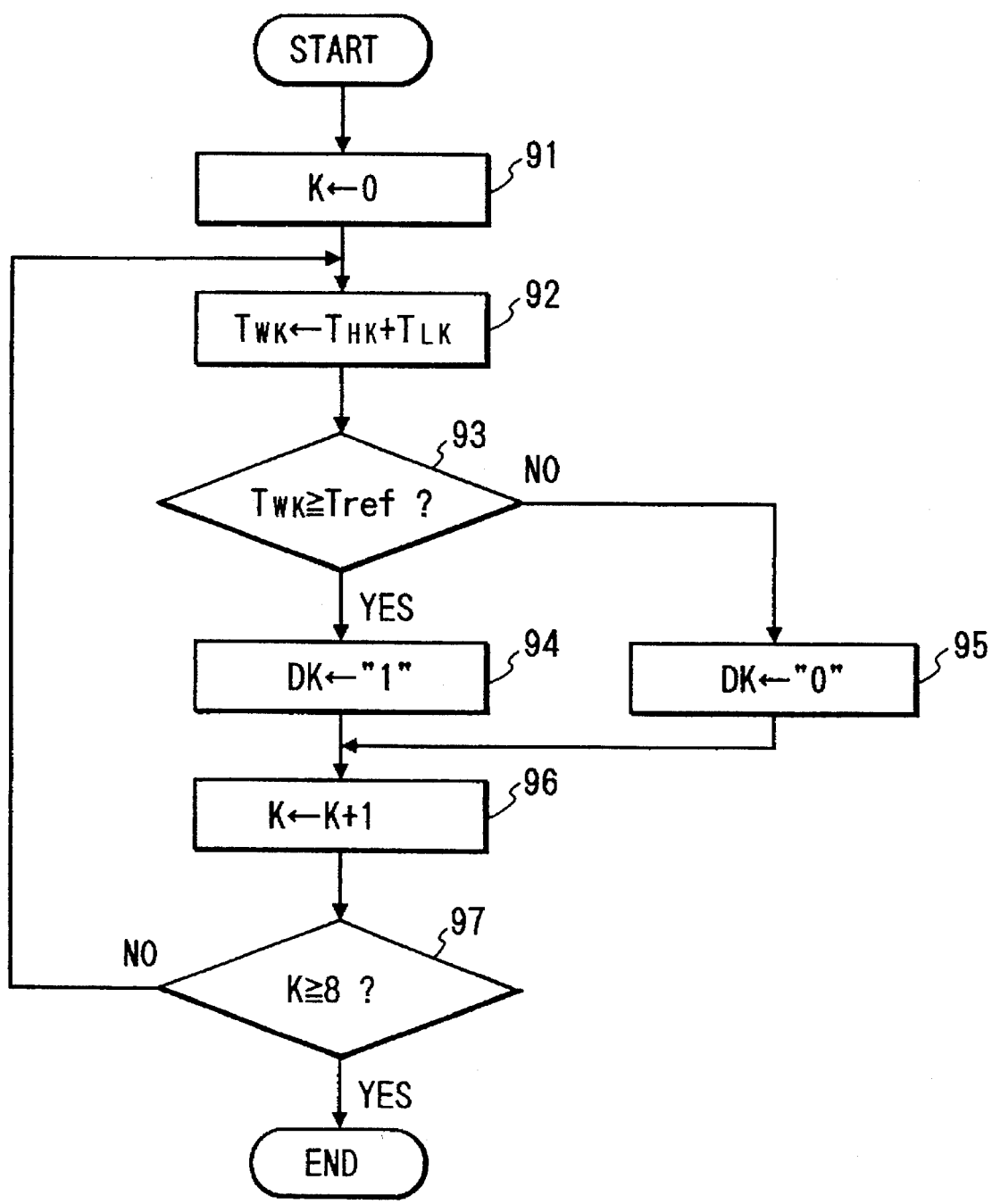
FIG. 8 is a flowchart of a segment of a program for operating a decoder in the television camera in the system of FIG. 1.

As previously described, the microcomputer in the decoder 2b operates in accordance with a program stored in the internal ROM. FIG. 8 is a flowchart of a segment of the program.

As shown in FIG. 8, a first step 91 of the segment of the program initializes a variable "k" to "0". The variable "k" is used in identifying a bit. After the step 91, the program advances to a step 92. The step 92 calculates the sum Twk of the length THk of an H-level period and the length TLk of a following L-level period in a data portion of the electric pulse signal fed from the photodetector 2a. A step 93 following the step 92 compares the sum Twk with a predetermined reference value Tref corresponding to, for example, 2.61 msec. When the sum Twk is equal to or greater than the reference value Tref, the program advances from the step 93 to a step 94. When the sum Twk is smaller than the reference value Tref, the program advances from the step 93 to a step 95. The step 94 sets 1-bit data Dk to "1". The step 95 sets the 1-bit data Dk to "0". The 1-bit data Dk represents the result of decoding of one bit in 8-bit information in the data portion of the electric basic pulse signal outputted from the photodetector 2a. The steps 94 and 95 are followed by a step 96 which increments the value "k" by "1". A step 97 following the step 97 compares the value "k" with a reference value of "8". When the value "k" is equal to or greater than "8", the program advances from the step 97 and the current execution cycle of the program segment ends. When the value "k" is smaller than "8", the program returns to the step 92. As a result, the logic states of the data D0, D1, D2, D3, D4, D5, D6, are D7 are set to "0" or "1" in accordance with the logic states of the 8-bit information represented by the data portion of the electric pulse signal fed from the photodetector 2a. In this way, 8-bit information (8-bit data) of a desired control type is recovered from the electric basic pulse signal outputted by the photodetector 2a.

The decoder 2b outputs the recovered 8-bit data to the switch 2c. The switch 2c selectively transmits the 8-bit data to the camera controller 2d or the system controller 3a in the main control unit 3. In general, the switch 2c is preset by the user. As previously described, the switch 2c includes, for example, a manual switch which can be changed between first and second positions.

When the switch 2c is preset in the first position, the 8-bit data is transmitted from the decoder 2b to the system controller 3a in the main control unit 3. The system controller 3a decides whether or not the received 8-bit data agrees with "00000100". When the 8-bit data agrees with "00000100", the system controller 3a outputs a control signal to the switch 3c so that the output terminal O1 of the switch 3c will be connected to the input terminal I1 of the switch 3c. In this case, the video signal outputted from the television camera 2 travels to the display 5 and the encoder/decoder 3b in the main control unit 3. The system controller 3a decides whether or not the received 8-bit data agrees with "00000101". When the 8-bit data agrees with "00000101", the system controller 3a outputs a control signal to the switch 3c so that the output terminal O1 of the switch 3c will be connected to the input terminal I2 of the switch 3c. In this case, the video signal and the audio signal outputted from the recording and reproducing device 4 travels to the display 5 and the encoder/decoder 3b in the main control unit 3. When the 8-bit data agrees with neither "00000100" nor "00000101", the system controller 3a transmits the 8-bit data to the camera controller 2d in the television camera 2 as a camera control signal.

When the switch 2c is preset in the second position, the 8-bit data is transmitted from the decoder 2b to the camera controller 2d. The camera controller 2d decides whether or not the 8-bit data received from the decoder 2b or the main control unit 3 agrees with "00000000". When the 8-bit data agrees with "00000000", the camera controller 3a outputs a control signal to the optical system driver 2e so that the camera movable casing 2g and the lens unit 2i will be subjected to a right-handed rotation. The camera 2d decides whether or not the 8-bit data received from the decoder 2b or the main control unit 3 agrees with "00000001". When the 8-bit data agrees with "00000001", the camera controller 3a outputs a control signal to the optical system driver 2e so that the camera movable casing 2g and the lens unit 2i will be subjected to a left-handed rotation. The camera controller 2d decides whether or not the 8-bit data received from the decoder 2b or the main control unit 3 agrees with "00000010". When the 8-bit data agrees with "00000010", the camera controller 3a outputs a control signal to the video processor 2f so that a video fade-in process will be executed by the video processor 2f. The camera controller 2d decides whether or not the 8-bit data received from the decoder 2b or the main control unit 3 agrees with "00000011". When the 8-bit data agrees with "00000011", the camera controller 2d outputs a control signal to the video processor 2f so that a video fade-out process will be executed by the video processor 2f. The video fade-out process corresponds to a process of inhibiting the outputting of the video signal. The camera controller 2d is not responsive to 8-bit data other than "00000000", "00000001", "00000010", and "00000011".

In a modification of this embodiment, there are two microphones, and a key B7 of a key input section 1a of a wireless operation unit 1 is assigned to a control type corresponding to change of active one of the two microphones. In this modification, a system controller 3a in a main control unit 3 is electrically connected to a switch for selecting one of the two microphones. The system controller 3a decides whether or not received 8-bit data agrees with "00000110". When the 8-bit data agrees with "00000110", the system controller 3a outputs a control signal to the switch so that active one of the two microphones will be changed.

DESCRIPTION OF THE SECOND PREFERRED EMBODIMENT

Figure 4:
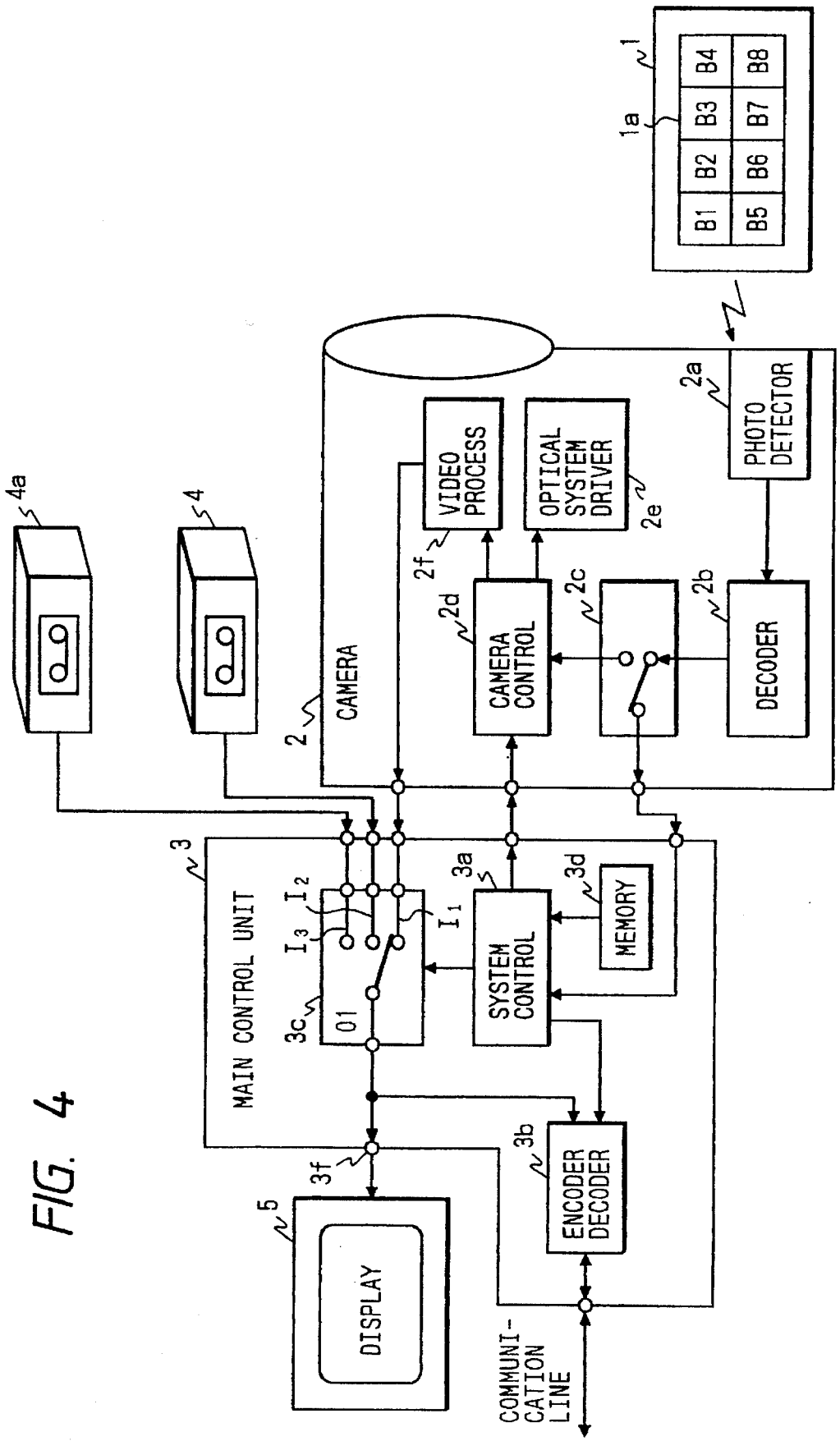
FIG. 4 is a block diagram of a television conference system according to a second embodiment of this invention.

FIG. 4 shows a second embodiment of this invention which is similar to the embodiment of FIG. 1 except for design changes indicated hereinafter. The embodiment of FIG. 4 includes a memory 3d electrically connected to a system controller 3a in a main control unit 3. The memory 3d stores a program and reference information for enabling the system controller 3a to recognize 8-bit data fed from a television camera 2. The memory 3d also stores information of control signals assigned to respective states of 8-bit data.

A recording and reproducing device 4a is electrically connected to an input terminal I3 of a switch 3c in the main control unit 3. The recording and reproducing device 4a is similar in structure to a recording and reproducing device 4.

A key B8 of a key input section 1a of a wireless operation unit 1 is assigned to a control type corresponding to selection of the recording and reproducing device 4a. Thus, actuation of the key B8 generates an 8-bit signal of "00000111"which represents that a desired control type is a process of inputting a television signal into the main control unit 3 from the recording and reproducing device 4a.

When a switch 2c in the television camera 2 is preset in a first position, the 8-bit data is transmitted from a decoder 2b in the television camera 2 to the system controller 3a in the main control unit 3. The system controller 3a recognizes the state of the 8-bit data by referring to the program and the reference information in the memory 3d. Then, the system controller 3a generates a control signal corresponding to the recognized state of the 8-bit data by referring to the program and the control signal information in the memory 3d. When the state of the 8-bit data is recognized as "00000111", the system controller 3a outputs a control signal to the switch 3c so that the output terminal O1 of the switch 3c will be connected to the input terminal I3 of the switch 3c. In this case, a video signal and an audio signal outputted from the recording and reproducing device 4a travels to a display 5 and an encoder/decoder 3b in the main control unit 3. When the state of the 8-bit data is recognized as "00000101", the system controller 3a outputs a control signal to the switch 3c so that the output terminal O1 of the switch 3c will be connected to the input terminal I2 of the switch 3c. In this case, a video signal and an audio signal outputted from the recording and reproducing device 4 travels to the display 5 and the encoder/decoder 3b in the main control unit 3. When the state of the 8-bit data is recognized as "00000001", the system controller 3a transmits the 8-bit data to a camera controller 2d in the television camera 2 as a camera control unit. In this case, the camera controller 2d generates a control signal in response to the 8-bit data and outputs the control signal to an optical system driver 2e so that a camera movable casing 2g and a lens unit 2i will be subjected to a left-handed rotation.

DESCRIPTION OF THE THIRD PREFERRED EMBODIMENT

Figure 9:
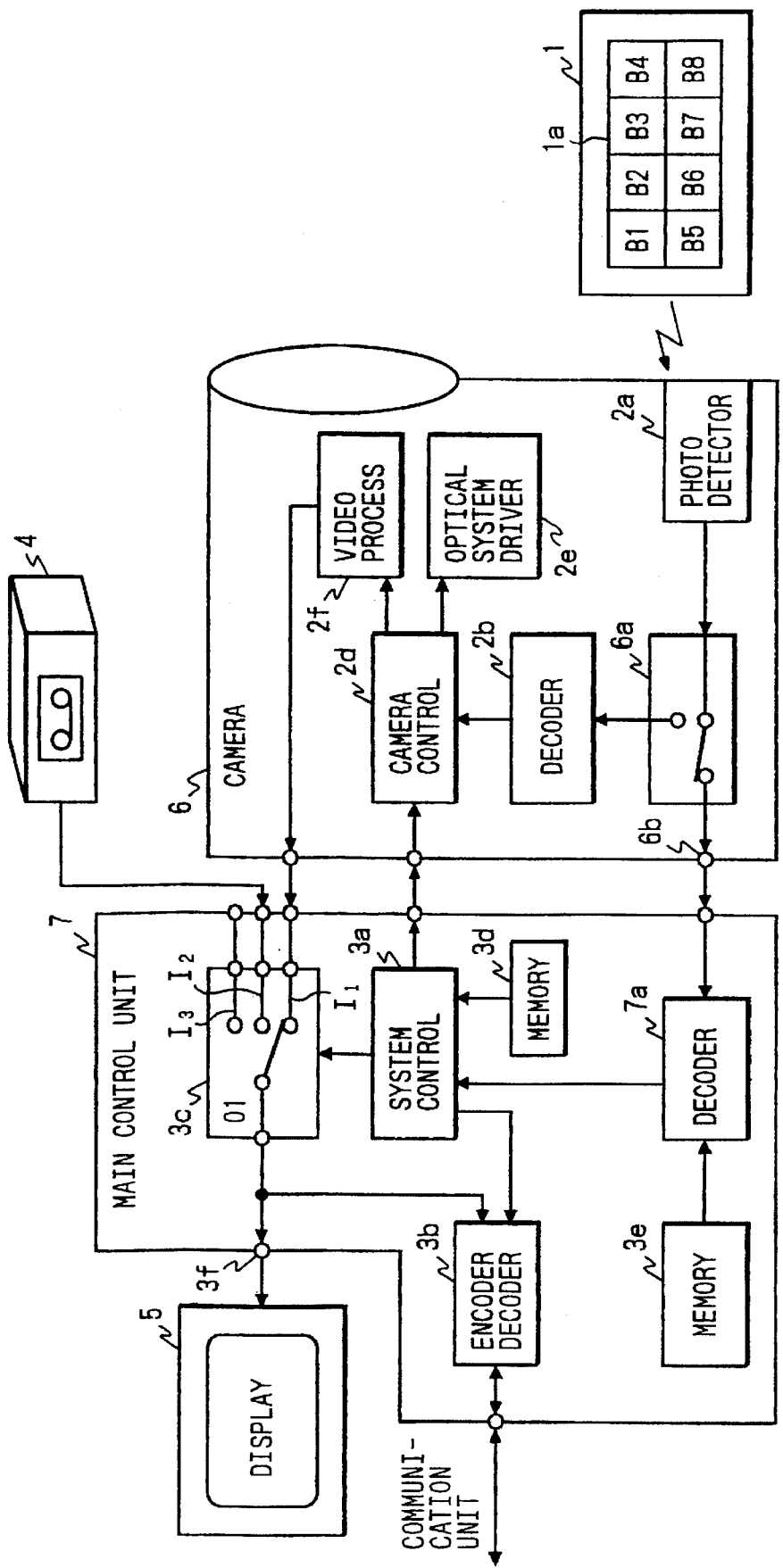
FIG. 9 is a block diagram of a television conference system according to a third embodiment of this invention.

With reference to FIG. 9, a television conference system includes a wireless operation unit 1, a television camera 6, and a main control unit 7. The wireless operation unit 1 transmits an infrared-ray signal when being actuated by the user. The wireless operation unit 1 is similar to that in the embodiment of FIG. 1. The television camera 6 takes an image of a conference. The television camera 6 has a window for receiving the infrared-ray signal from the wireless operation unit 1. The main control unit 7 is electrically connected to the television camera 6. The main control unit 7 is designed to control the operation of the television conference system. The main control unit 7 includes an encoder and a decoder operating on a television signal including video information and audio information.

A recording and reproducing device 4 is electrically connected to the main control unit 7. The recording and reproducing device 4 functions to record and reproduce a video signal and an audio signal into and from a recording medium such as a magnetic tape. A display 5 is electrically connected to the main control unit 7. The display 5 serves to indicate an image to the user. The recording and reproducing device 4, and the display 5 are similar to those in the embodiment of FIG. 1.

A microphone (not shown) is successively followed by an audio processor (not shown) and a multiplexer (not shown). Audio information generated by the microphone is fed to the multiplexer via the audio processor. Video information generated by the television camera 6 is also fed to the multiplexer. The multiplexer combines the audio information and the video information into a television signal of a given format.

The display 5 indicates an image represented by a television signal. The display 5 is provided with an audio circuit and a loudspeaker for reproducing audio information from the television signal.

The wireless operation unit 1 has a key input section 1a including an array of keys B1, B2, B3, B4, B5, B6, B7, and B8. The wireless operation unit 1 also has a section for generating an electric signal in response to actuation of the keys B1–B8, a section for generating and emitting an infrared-ray signal, and a section for modulating the infrared-ray signal in response to the electric signal.

The television camera 6 contains a photodetector 2a. The photodetector 2a functions to receive an infrared-ray signal, and to convert the received infrared-ray signal into a corresponding electric signal. The photodetector 2a is similar to that in the embodiment of FIG. 1. The television camera 6 also includes a switch 6a and a decoder 2d. The switch 6a is electrically connected to the photodetector 2a, the decoder 2b, and the main control unit 7. The switch 6a receives an output signal from the photodetector 2a. The switch 6a selectively transmits the output signal from the photodetector 2a to the decoder 2b or the main control unit 7. The switch 6a includes, for example, a manual switch.

The decoder 2b includes a microcomputer having a combination of an I/O port, a CPU, a ROM, and a RAM. The decoder 2b operates in accordance with a program stored in the ROM. The decoder 2b is similar to that in the embodiment of FIG. 1. When the switch 6a transmits the output signal from the photodetector 2a to the decoder 2b, the decoder 2b extracts 8-bit information (8-bit data) of a desired control type from the received signal.

The television camera 6 also has a camera controller 2d, an optical system driver 2e, and a video processor 2f. The camera controller 2d is electrically connected to the decoder 2b, the optical system driver 2e, the video processor 2f, and the main control unit 7. The camera controller 2d includes, for example, a microcomputer or a similar device having a combination of an I/O port, a CPU, a ROM, and a RAM. The camera controller 2d can operate in accordance with a program stored in the ROM. The optical system driver 2e is mechanically connected to a camera optical system. The optical system driver 2e includes electrically-powered actuators such as motors for moving a camera body and a camera lens. The video processor 2f converts an image, received via the optical system, into a corresponding video signal. The video processor 2f is electrically connected to the main control unit 7. The video signal outputted from the video processor 2f is fed to the main control unit 7. The camera controller 2d, the optical system driver 2e, and the video processor 2f are similar to those in the embodiment of FIG. 1. The television camera 6 is basically similar to the television camera 2 of FIG. 1 except for the switch 6a.

The main control unit 7 includes a decoder 7a and a memory 3e. The decoder 7a is electrically connected to the memory 3e. The decoder 7a is electrically connected to the switch 6a in the television camera 6 via an output port 6b of the television camera 6. The decoder 7a includes a microcomputer. The memory 3e stores a program and reference information. When the switch 6a in the television camera 6 transmits the output signal from the photodetector 2a to the decoder 7a, the decoder 7a extracts 8-bit information (8-bit data) of a desired control type from the received signal by referring to the program and the reference information in the memory 3e. The combination of the decoder 7a and the memory 3e operates similarly to the decoder 2b.

The main control unit 7 includes a system controller 3a and a memory 3d. The system controller 3a is electrically connected to the camera controller 2d in the television camera 6. Also, the system controller 3a is electrically connected to the memory 3d and the decoder 7a. The system controller 3a serves to output instructions for controlling the television conference system. The system controller 3a includes, for example, a microcomputer or a similar device. The memory 3d stores a program and reference information for enabling the system controller 3a to recognize 8-bit data fed from the decoder 7a. The memory 3d also stores information of control signals assigned to respective states of 8-bit data. The system controller 3a is basically similar to that in the embodiment of FIG. 1.

The main control unit 7 includes an encoder/decoder 3b. The encoder/decoder 3b is electrically connected to the system controller 3a and a communication line. Image information and audio information can be transmitted to and received from a communication opposite party of a television conference via the encoder/decoder 3b and the communication line. The encoder/decoder 3b has a section for encoding an analog television signal into a corresponding digital television signal of a given code, and a section for decoding a digital television signal of a given code into a corresponding analog television signal. The encoder/decoder 3b is similar to that in the embodiment of FIG. 1.

The decoder/encoder 3b is electrically connected to the display 5 via an output port 3f of the main control unit 7. The analog television signal generated by the decoder/encoder 3b travels to the display 5 so that video information and audio information in the analog television signal can be reproduced by the display 5.

The main control unit 7 also includes a switch 3c having one output terminal O1, three input terminals I1, I2, and I3, and a control terminal. The switch 3c selects one of the input terminals I1, I2, and I3, and connects the selected input terminal to the output terminal O1 in response to a control signal fed to the control terminal thereof. The input terminal I1 of the switch 3c is electrically connected to the video processor 2f in the television camera 6. The input terminal I2 of the switch 3c is electrically connected to the recording and reproducing device 4. The input terminal I3 of the switch 3c is reserved. The output terminal O1 of the switch 3c is electrically connected to the encoder/decoder 3b. The output terminal O1 of the switch 3c is electrically connected to the display 5 via the output port 3f of the main control unit 7. The control terminal of the switch 3c is electrically connected to the system controller 3a. Accordingly, the switch 3c is controlled by the system controller 3a. The switch 3c is similar to that in the embodiment of FIG. 1.

Different types of control of the television conference system are assigned to the keys B1, B2, . . . , B7, and B8 of the key input section 1a of the wireless operation unit 1 respectively. The key input section 1a outputs an 8-bit digital signal (8-bit information or 8-bit data) representative of a desired control type in response to actuation of the keys B1, B2, . . . , B7, and B8 as in the embodiment of FIG. 1.

As previously described, the switch 6a in the television camera 6 selectively transmits the output signal from the photodetector 2a in the television camera 6 to the decoder 2b in the television camera 6 or the decoder 7a in the main control unit 7. In general, the switch 6a is preset by the user. As previously described, the switch 6a includes, for example, a manual switch which can be changed between first and second positions.

When the switch 6a is preset in the first position, the output signal from the photodetector 2a in the television camera 6 is transmitted to the decoder 7a in the main control unit 7. In this case, the decoder 7a extracts 8-bit data from the received signal, and outputs the 8-bit data to the system controller 3a. The system controller 3a decides whether or not the received 8-bit data agrees with "00000100". When the 8-bit data agrees with "00000100", the system controller 3a outputs a control signal to the switch 3c so that the output terminal O1 of the switch 3c will be connected to the input terminal I1 of the switch 3c. In this case, the video signal outputted from the television camera 6 travels to the display 5 and the encoder/decoder 3b in the main control unit 7. The system controller 3a decides whether or not the received 8-bit data agrees with "00000101". When the 8-bit data agrees with "00000101", the system controller 3a outputs a control signal to the switch 3c so that the output terminal O1 of the switch 3c will be connected to the input terminal I2 of the switch 3c. In this case, the video signal and the audio signal outputted from the recording and reproducing device 4 travels to the display 5 and the encoder/decoder 3b in the main control unit 7. When the 8-bit data agrees with neither "00000100" nor "00000101", the system controller 3a transmits the 8-bit data to the camera controller 2d in the television camera 6 as a camera control signal.

When the switch 6a is preset in the second position, the output signal from the photodetector 2a is transmitted to the decoder 2b in the television camera 6. In this case, the decoder 2b extracts 8-bit data from the received signal, and outputs the 8-bit data to the camera controller 2d. The camera controller 2d decides whether or not the 8-bit data received from the decoder 2b or the main control unit 7 agrees with "00000000". When the 8-bit data agrees with "00000000", the camera controller 3a outputs a control signal to the optical system driver 2e so that a camera movable casing 2g and a lens unit 2i (see FIG. 3) will be subjected to a right-handed rotation. The camera controller 2d decides whether or not the 8-bit data received from the decoder 2b or the main control unit 7 agrees with "00000001". When the 8-bit data agrees with "00000001", the camera controller 3a outputs a control signal to the optical system driver 2e so that the camera movable casing 2g and the lens unit 2i (see FIG. 3) will be subjected to a left rotation. The camera controller 2d decides whether or not the 8-bit data received from the decoder 2b or the main control unit 7 agrees with "00000010". When the 8-bit data agrees with "00000010", the camera controller 3a outputs a control signal to the video processor 2f so that a video fade-in process will be executed by the video processor 2f. The camera controller 2d decides whether or not the 8-bit data received from the decoder or the main control unit 7 agrees with "00000011". When the 8-bit data agrees with "00000011", the camera controller 2d outputs a control signal to the video processor 2f so that a video fade-out process will be executed by the video processor 2f. The video fade-out process corresponds to a process of inhibiting the outputting of the video signal. The camera controller 2d is not responsive to 8-bit data other than "00000000", "00000001", "00000010", and "00000011".

In a modification of this embodiment, there are two microphones, and a key B7 of a key input section 1a of a wireless operation unit 1 is assigned to a control type corresponding to change of active one of the two microphones. In this modification, a system controller 3a in a main control unit 7 is electrically connected to a switch for selecting one of the two microphones. The system controller 3a decides whether or not received 8-bit data agrees with "00000110". When the 8-bit data agrees with "00000110", the system controller 3a outputs a control signal to the switch so that active one of the two microphones will be changed.

DESCRIPTION OF THE FOURTH PREFERRED EMBODIMENT

A fourth embodiment of this invention is similar to the embodiment of FIG. 1 or the embodiment of FIG. 9 except for design changes indicated later.

Figures 10, 11:
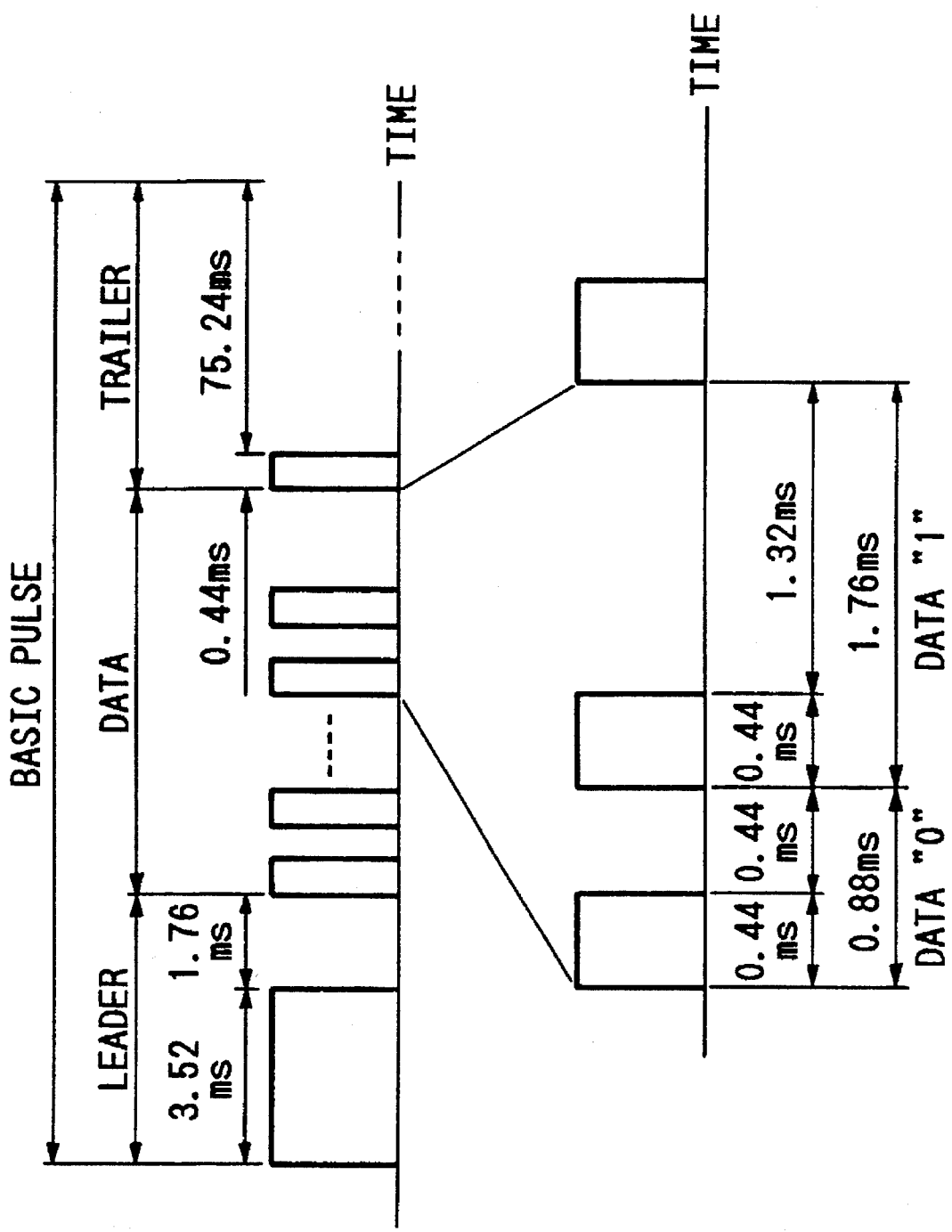
FIG. 10 is a time-domain diagram of the waveform of an example of a basic pulse signal generated in a wireless operation unit in a television conference system according to a fourth embodiment of this invention.
FIG. 11 is a time-domain diagram of the waveform of a data portion in the basic pulse signal of FIG. 10.

In the fourth embodiment, as shown in FIG. 10, an electric basic pulse signal generated in a wireless operation unit 1 (see FIG. 1 or FIG. 9) has a sequence of a leader portion, a data portion, and a trailer portion. Information of a desired control type is represented by the data portion of the electric basic pulse signal. The data portion of the electric basic pulse signal results from pulse-position modulation responsive to an electric 8-bit signal outputted from a key input section 1a (see FIG. 1 or FIG. 9). In the data portion of the electric basic pulse signal, H-level periods alternate with L-level periods. H-level periods agree with a fixed time of 0.44 ms while L-level periods have variable lengths. A set of an H-level period and a following L-level period corresponds to one bit. As shown in FIG. 11, a logic state ("0" or "1") of each bit depends on the total length of an H-level period and a following L-level period. Under typical conditions, a logic state of "0" corresponds to a total period length of 0.88 ms, and a logic state of "1" corresponds to a total period length of 1.76 ms. The LSB of the electric 8-bit signal outputted from the key input section 1a is represented by a head of the data portion of the electric basic pulse signal.

In the fourth embodiment, a decoder 2b in a television camera 2 (see FIG. 1), a decoder 2b in a television camera 6 (see FIG. 9), and a memory 3e connected to a decoder 7a in a main control unit 7 (see FIG. 9) are modified so that a reference time Tref used in a step 93 of FIG. 8 corresponds to a time of 1.32 ms.

What is claimed is:

1. An image taking apparatus comprising:
   a wireless operation unit for transmitting a wireless signal including camera-control information;
   a camera portion having a camera body and an optical system;
   first means disposed in the camera body for receiving the wireless signal from the wireless operation unit, and for converting the wireless signal into a corresponding electric signal including the camera-control information;
   a main control unit separate from the camera portion;
   second means for transmitting the electric signal form the first means to the main control unit;
   a decoder disposed in the main control unit for recovering the camera-control information from the electric signal transmitted from the first means;
   a converter disposed in the main control unit for converting the camera-control information recovered by the decoder into a camera-control command signal;
   third means for transmitting the camera-control command signal from the converter from the main control unit to the camera portion; and
   fourth means disposed in the camera portion for controlling the optical system in response to the camera-control signal transmitted from the converter in the main control unit.

2. An image taking apparatus comprising:
   a wireless operation unit for transmitting a wireless signal including camera-control information;
   a camera portion having a camera body and an optical system, the camera body having a fixed segment and a movable segment movably connected to the fixed segment, the optical system being supported by the movable segment;
   first means disposed in the fixed segment of the camera body for receiving the wireless signal from the wireless operation unit, and for converting the wireless signal into a corresponding electric signal including the camera-control information;
   a main control unit separate from the camera portion;
   second means for transmitting the electric signal from the first means to the main control unit;
   a decoder disposed in the main control unit for recovering the camera-control information from the electric signal transmitted from the first means;
   a converter disposed in the main control unit for converting the camera-control information recovered by the decoder into a camera-control command signal;
   third means for transmitting the camera-control command signal from the converter in the main control unit to the camera portion; and
   fourth means disposed in the camera portion for moving the movable segment of the camera body relative to the fixed segment thereof in response to the camera-control command signal transmitted from the converter in the main control unit.

* * * * *